UNITED STATES PATENT OFFICE.

BENNO HOMOLKA, OF FRANKFORT-ON-THE-MAIN, AND ROBERT WELDE, OF HÖCHST-ON-THE-MAIN, GERMANY, ASSIGNORS TO FARBWERKE VORM. MEISTER LUCIUS & BRÜNING, OF HÖCHST-ON-THE-MAIN, GERMANY, A CORPORATION OF GERMANY.

PROCESS OF MAKING SULFUR DYES AND THEIR LEUCO BODIES.

No. 893,499.　　　Specification of Letters Patent.　　Patented July 14, 1908.

Application filed March 13, 1908. Serial No. 420,841.

*To all whom it may concern:*

Be it known that we, BENNO HOMOLKA, Ph. D., and ROBERT WELDE, Ph. D., chemists, citizens of the Empire of Germany, and residing at Frankfort-on-the-Main and Höchst-on-the-Main, Germany, respectively, have invented certain new and useful Improvements in the Manufacture of Sulfurized Dyestuffs and Their Leuco Bodies, of which the following is a specification.

It has been found that the ortho-thio-acetophenones (phenthiol-ortho-methylketones) of the general formula:

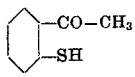

(wherein the hydrogen atoms of the benzene residue may be substituted fully or partially by the alkyl- or alkyloxy-residues, by halogen etc.) may be transformed into vat-dyestuffs containing sulfur by depriving them of the hydrogen. This dehydrogenation takes place in an alkaline solution by means of the atmospheric oxygen or some other oxidizing-agent, whereby the dyestuffs are obtained directly; or it may be effected by means of sulfur by which the leuco-bodies are first obtained, which are quickly transformed into the corresponding dyestuffs by the action of the atmospheric oxygen.

The ortho-thio-acetophenones used in this process are obtained by substituting the residue SH, according to the known methods for diazo-compounds, for the amino-group of the corresponding ortho-amino-acetophenones. The ortho-thio-acetophenones are oils which do not distil without decomposition, they are scarcely soluble in water, but easily soluble in dilute alkalies and alkali sulfids. The simplest ortho-thio-acetophenone melts in vacuum at about 124 to 126° C. Upon exposure to the air the ortho-thio-acetophenones oxidize very easily and thus yield the colorless di-thio-bodies of the general formula:

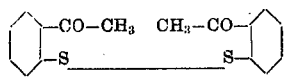

crystallizing out well from alcohol.

Example I: 152 parts by weight of ortho-thio-acetophenone are dissolved in 1000 parts by weight of water while adding 200 parts by weight of caustic soda-lye of 27° Bé. A strong current of air is allowed to pass through the hot yellow solution, whereby the dyestuff produced precipitates in the form of red flakes. Some times, especially if the oxidation be slow, the formation of a blue intermediate product is observed, which on continued oxidation turns into the red dyestuff. The dyestuff is then filtered, washed with water and may be freed from di-thio-body (a by-product which forms in small quantities) by boiling with alcohol. The red dyestuff thus obtained is insoluble in the usual dissolvents; treated with alkaline reducing-agents, it becomes a vat-dye and will dye wool and cotton reddish-blue shades.

In the foregoing example the atmospheric oxygen may be replaced by other oxidizing-agents, such as ferricyanid of potassium, persulfate, perborate, percarbonate etc. However, the oxidation by means of the atmospheric oxygen is preferable on account of its greater cheapness and because in the artificial oxidation considerable quantities of the by-product mentioned as "di-thio-body" form.

Example II: 152 parts by weight of ortho-thio-acetophenone are introduced into about 750 parts by weight of melted sodium sulfid ($NaS + 9H_2O$) and heated while stirring well, after addition of 64 parts by weight of sulfur, until about half of the water of crystallization has evaporated. Afterwards the melt is maintained in a reflux apparatus until no more parent material is traceable. Now, the melt contains the leuco-body and may, when dissolved in water, be directly used for dyeing. When exposed to the air, the red dyestuff separates immediately from the aqueous solution of the melt.

Having now described our invention, what we claim is:

The process for the production of dyestuffs containing sulfur which consists in treating ortho-thio-acetophenones (phenthiol-ortho-methylketones) in alkaline solutions with dehydrogenating agents, whereby, when sulfur is used as such an agent, at first the leuco-bodies are obtained.

In testimony, that we claim the foregoing as our invention, we have signed our names in presence of two subscribing witnesses.

BENNO HOMOLKA.
　　　　　　　　ROBERT WELDE.

Witnesses:
　JEAN GRUND,
　CARL GRUND.